March 24, 1931.   J. LEDWINKA   1,797,989
METAL VEHICLE BODY
Filed Dec. 22, 1924   5 Sheets-Sheet 1

INVENTOR.
JOSEPH LEDWINKA
BY
ATTORNEY.

March 24, 1931.　　　J. LEDWINKA　　　1,797,989
METAL VEHICLE BODY
Filed Dec. 22, 1924　　5 Sheets-Sheet 2

INVENTOR.
JOSEPH LEDWINKA
BY
ATTORNEY.

March 24, 1931.    J. LEDWINKA    1,797,989
METAL VEHICLE BODY
Filed Dec. 22, 1924    5 Sheets-Sheet 3

INVENTOR.
JOSEPH LEDWINKA
BY
ATTORNEY.

March 24, 1931.   J. LEDWINKA   1,797,989
METAL VEHICLE BODY
Filed Dec. 22, 1924   5 Sheets-Sheet 4

INVENTOR.
JOSEPH LEDWINKA
BY
ATTORNEY.

March 24, 1931.    J. LEDWINKA    1,797,989
METAL VEHICLE BODY

Filed Dec. 22, 1924    5 Sheets-Sheet 5

INVENTOR.
JOSEPH LEDWINKA
BY
ATTORNEY.

Patented Mar. 24, 1931

1,797,989

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

METAL VEHICLE BODY

Application filed December 22, 1924. Serial No. 757,500.

My invention relates primarily to touring car bodies of pressed metal construction, and particularly to that class of bodies of that type known as unit construction bodies. Many of its features, however, may be found of utility in connection with other types of bodies.

My prime object is to produce a framework structure including a minimum number of parts, those parts of the simplest and most regular form possible consistent with strength of parts and joinder of parts.

Another object is the utilization of panel structure wherever possible to form a part of the frame structure, and to impart to the panel structure those conformations through which it may be effectually co-ordinated with or embodied in the framework as a part thereof.

An outstanding aim in connection with the preceding object has been the building of body side sills in part of portions and extensions of the body side panels and in part of longitudinal sill stringers, whereby there results not only an economy in materials, but an added strength and durability from the intimate relations of the side panel metal with the sill structure.

Still further, it is an object of my invention to make more intimate the relation of the body post to both the side panel and the sills. This I achieve by constituting the outer portion of the side sill, the side panel and body post a one-piece structure which of course has its foundation in the side sill itself.

Yet another important object is the increase of the effectiveness and the efficiency of manufacture and assembly of the joints between the units of said body. In the particular embodiment with which I have been dealing, the division is into three units in planes just to the rear of the cowl and just forward of the tonneau, giving rise to units commonly known as the cowl unit the front seat unit and the tonneau unit. The front seat unit carries the main body side sills and the joints are effected between the ends of these main body side sills and the base portions of the frameworks of the cowl and tonneau sections, respectively.

An ancillary aim in connection with this object is the anchorage of the base of the body post which enters into such a joint. And another such object is the provision of such joint as will enable effective joinder to be made in cases where there is a great inclination of the inner face of the main body sill or associated structure, or in the case of any other interior framework or panel irregularity associated with the joint itself. Such inclinations and irregularities have heretofore given considerable difficulty.

Subordinate objects relate to a general improvement of the details of the several units adapting them more particularly for co-ordination by the framework structure which constitutes the main object of my invention, rendering them more efficient in combination with the framework and sill structure, a reduction of the aggregate number of parts, a simplification of those remaining, a lightening and strengthening of them all, an openness of construction to give accessibility for welding and riveting operations, more especially for welding, an adaptation for jig assembly and subassembly, etc., with a net result in a cheaper yet more comfortable and easier riding body with greater over-all strength and durability.

In the accompanying drawings I show one embodiment of my invention.

Of the drawings—

Fig. 3 is a central, vertical, longitudinal section thereof on line 3—3 of Fig. 4.

Fig. 8 is a cross section of the threshold portion of the sill taken on lines 8—8 of Figs. 2 and 3.

Figs. 10, 11 and 12 are, respectively, sections on the corresponding lines 10—10, 11—11 and 12—12, respectively, of Fig. 3, and in the directions indicated.

Fig. 24—A is an enlarged rear view of the portion of the structure shown in Fig. 24.

Figures 1, 19, 20, 21, 22, 35, 36, 38, 39:
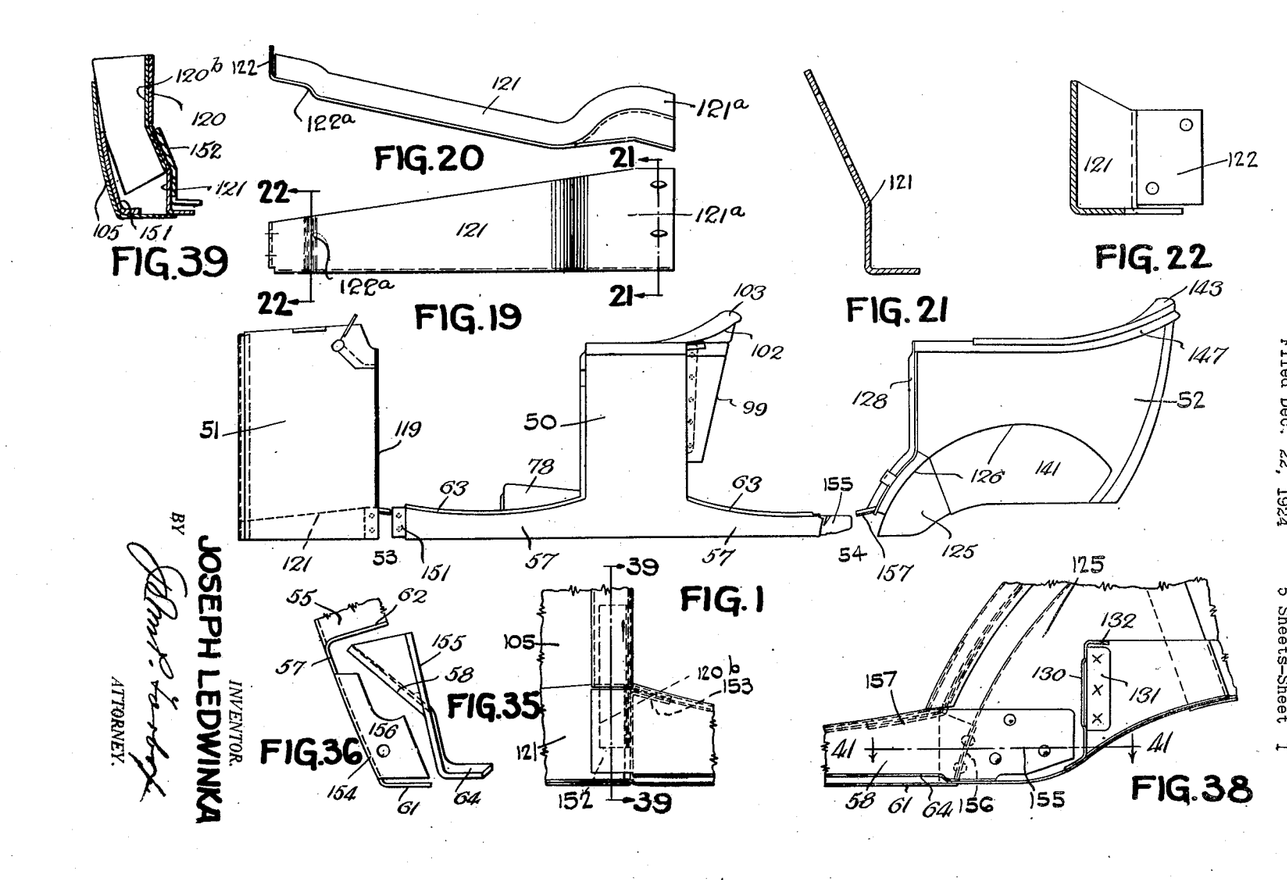
Fig. 1 is a side elevation of the body with the three units slightly separated at the joints.
Figs. 19 and 20 are, respectively, outside elevation and plan of the cowl side sill.
Fig. 21 is a cross section on line 21—21 of Fig. 19.
Fig. 22 a cross section on line 22—22 of Figure 19, each looking in the direction shown by the arrows.
Fig. 35 is an inside side elevation, taken as indicated by the arrows at the ends of the dot and dash line 35—35 of Fig. 14 of the joint between the fore ends of the body side sills of the front seat unit and the rear portion of the base of the front cowl unit which rear portion alone is shown in Fig. 24.
Fig. 36 is a rear end elevation of the rear end of the main body side sill of the front seat unit taken as indicated by arrows 36—36 associated with Fig. 4.
Fig. 38 is an inside vertical elevation of the joint between the rear end of the main body side sills and the tonneau unit, brought about by the joinder of the parts shown in elevation in Figs. 36 and 37.
Fig. 39 is a view taken as indicated by the arrows 39—39 associated with Fig. 35.

Referring first to Fig. 1, the front seat unit is designated generally by numeral 50, the cowl unit by numeral 51 and the rear or tonneau unit by 52. The joint between the front seat unit and the cowl unit is designated 53 in general, and likewise the joint between the front seat unit and the tonneau unit is designated 54. The front seat unit is delineated particularly in Figs. 2, 3 and 4, and the associate sections and detail views. It is built up in the main of main body side sill structures designated generally 55, and an interconnecting cross brace and seat structure designated generally 56.

Figures 2, 4, 5, 6, 7, 41:
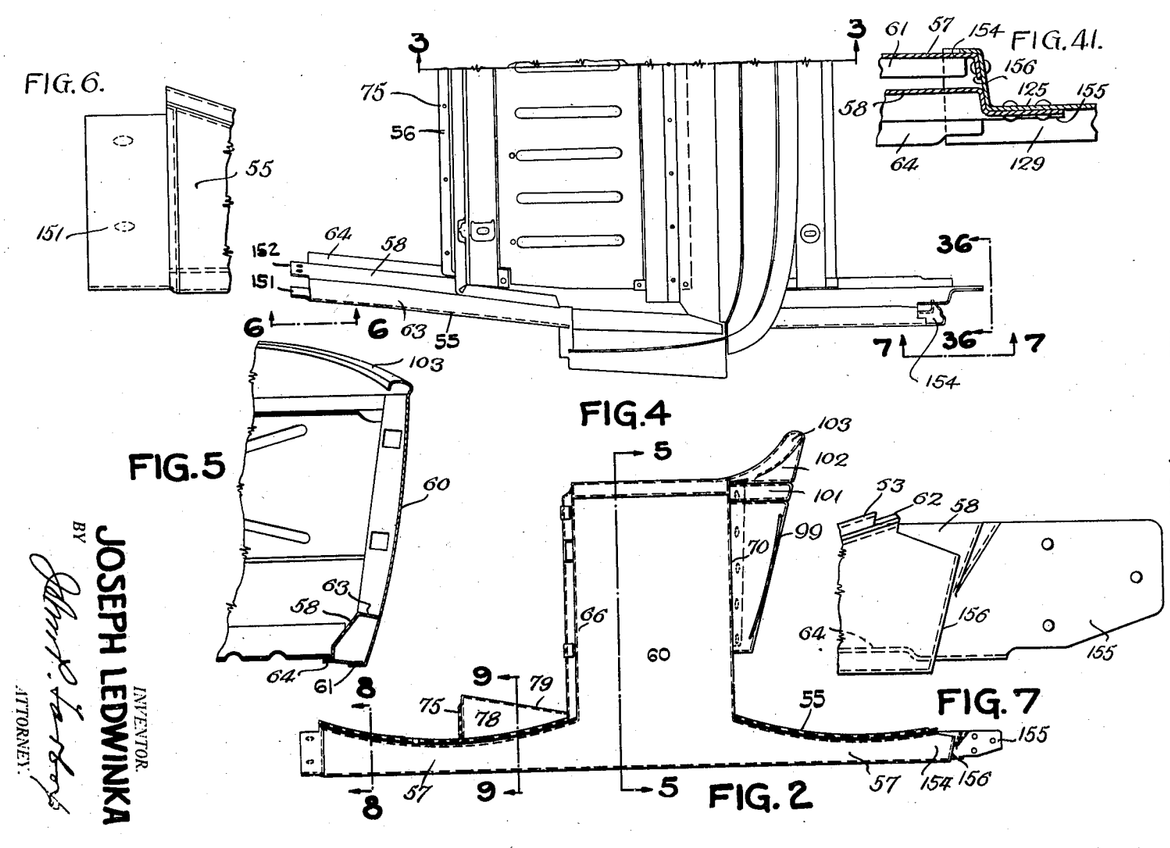
Fig. 2 is an enlarged side elevation of the front seat or central unit.
Fig. 4 is a plan view of the left half of this section from the center line of the body.
Fig. 5 is a partial, vertical transverse section taken on the line 5—5 of Fig. 2 looking rearwardly.
Figs. 6 and 7 are enlarged outside elevations of the ends of the main body side sills embodied in this front seat unit, taken as indicated by arrows 6—6 and 7—7 in Fig. 4.
Fig. 41 is a view taken as indicated by arrows 41—41 associated with Fig. 38 showing particularly the joinder between the main body side sills and the D post bracket.
Figures 3, 8, 10, 24A:
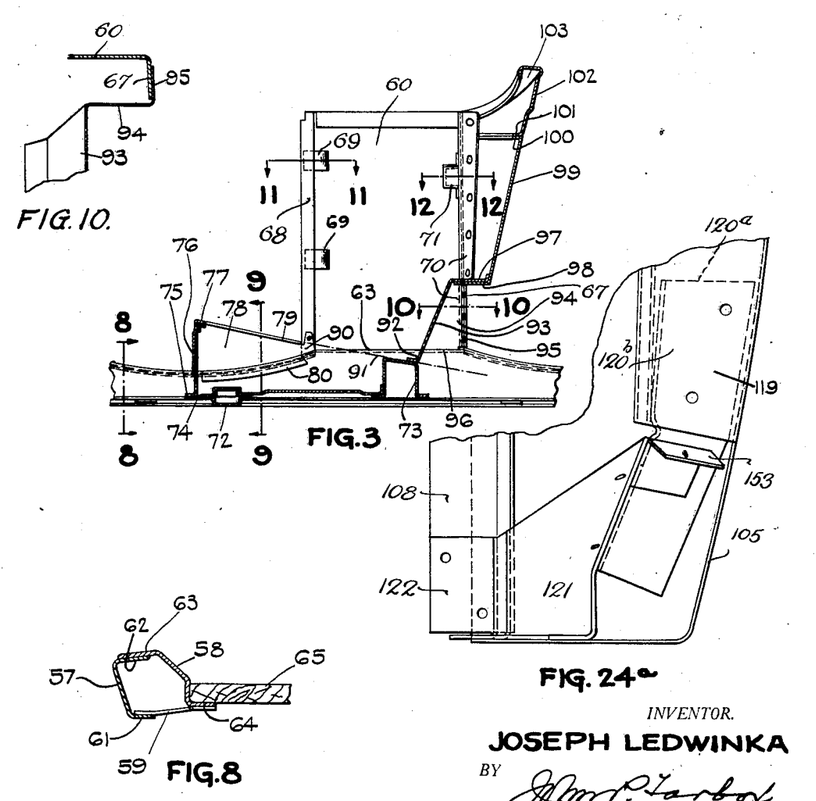
Figure 9:
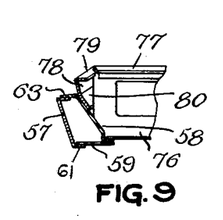
Fig. 9 is a similar section opposite the front seat support taken on line 9—9 of the same figure looking in the direction of the arrows.

The main body side sills 55 are in general of inverted channel construction, as shown in Figs. 8 and 9, associated with Fig. 3. The outer half 57 of the channel section and the inner half 58 thereof have the lower edges of their side walls interconnected by straps 59 welded thereto at intervals. The outer portion 57 of the sill, both forwardly and rearwardly, is a direct one-piece extension from the base of the body side panel 60 as clearly appears in Figs. 1 and 2. The lower edge of the side panel 60 is provided with inwardly extending flange 61, appearing in Fig. 5, and this flange is extended throughout the length of the sill extensions, as appears in Figs. 3, 8 and 9. The body of the panel 60, however, is not deflected, and both it and the extension therefrom are conformed to the exterior contour of the body itself. The upper edges of the extension 57, however, are provided with inwardly-extending flanges 62 which constitute a part of the threshold of the door in each case. The other half of the sill 58 is a through running longitudinal stringer in general of Z section, the body web of which is bent outwardly. Its upper arm 63 overlies the threshold flanges on the extension 57 constituting the outer half of the sill, and the outer edge of this overlying upper arm is contoured to conform with the body contour of the member 57 as defined by the apex of the angle between its branches, and the parts are welded in this overlapped relation and thus form a closed bottom for the channel section of the sill. Opposite the upstanding body of the panel 60, however, as shown in Fig. 5, the arm 63 merely abuts the body of the panel and is not attached thereto, with the result that the bottom of the channel at this point is not joined with the outer side wall thereof, the panel 60 projecting freely thereabove. The lower arm 64 of the Z section constitutes an inwardly-extending flange for the support of floor boards 65. The outwardly inclined main web of this inner half 58 of the sill constitutes the inclined inner face of the threshold of the door. The top of the threshold is constituted by the upper arm 63. This threshold in each case is curved in contour, substantially on the arc of a circle, the threshold being in effect of concave formation so that its lateral extremities are higher than its middle and the sill section is correspondingly deeper at opposite ends than in the middle.

Figure 11:
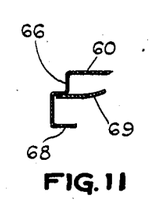
Figure 12:
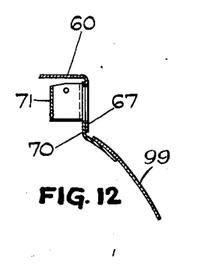

In addition to the extensions 57 formed in one piece with the body side panel 60, there are also formed in one piece with it, inwardly extending flanges 66 and 67 on its front and rear edges, which flanges co-act with the immediately adjacent portion of the panel 60 and their associated parts to constitute door post structures as shown in Figs. 2, 3, 11 and 12. The front or B post structure, as clearly shown in Figs. 3 and 11, is comprised of the flange 66, the body of which is offset to form a rabbet for the door, and a rearward inner extension 68. These two portions 66 and 68 together with the immediately adjacent body of the panel 60 constitute a vertically extending post of channel cross-section opening or presenting rearwardly. Mounted within it, are the various devices arranged to coact with that edge of the door which shuts against this post. Also mounted within it and welded to the offset of the rabbet are upholstery securing tabs 69. The post at the rear edge of the panel, commonly called the "C-post", is formed by the inturned flange 67, the immediately adjacent body of the panel 60 and a vertically extending angle 70, welded to the inner face of the flange 67 by one branch and having its other branch projecting inwardly and rearwardly. This post structure has mounted in it hinge sockets 71 adapted to receive the ends of the hinge wings fixed to the door which swings from this post. Other devices adapted to coact with the door may be mounted in addition to or in substitution of these hinge sockets 71.

Inter-connecting the body side sills 55 through joinder to the tops of the inner flange 64 are cross connecting braces 72 and 73 respectively, the one of box formation and the other of inverted channel formation as shown in Fig. 3. The brace 72, while of box section, is really formed of two members of channel section having their side walls flanged laterally and the flanges secured together by welding or otherwise. The forward flange of the upper section of this cross brace 72 is of greater width than the corresponding flange of the lower section and has its front edge offset to give it a Z-section. Mounted on the lower arm 74 of the Z by means of a forwardly extending flange 75 is the transverse front seat heel board 76, the upper edge of which 77 is turned rearwardly and downwardly to conform to the plane of the seat. The opposite ends of this heel board 76 are turned rearwardly as shown in Figs. 2, 3, 4 and 9 to overlie the inclined inner faces of the threshold. These rearward extensions 78 have their upper edges 79 turned inwardly as are the upper edges 77 of the body 76 of the heel board and likewise to lie in the rearwardly and downwardly inclined plane of the seat. Their bottom edges, however, are inwardly instead of outwardly flanged as indicated at 80 (Fig. 3) and this flange 80 is welded or otherwise secured to the inclined face of the threshold which it overlies. The rear extremities 90 of the extension 78 are respectively secured to the inner faces of the B-post structure at the front edge of the side panel 60.

The rear cross brace 73 of inverted channel section is of considerable size, and its bottom is arranged at such height and inclination as to place it in the inclined plane of the seat designated by line 91 in extension of the plane defined by the inturned edges 77 and 79 of the heel board 76, 78. This assemblage of parts, 76, 78, 73, constitute the front, rear and end supporting structure of the seat itself.

Seated (Figs. 3 and 4) upon the rear edge of the inclined bottom of channel brace 73 by a forwardly extending flange 92 is the bottom section 93 of the front seat panel. The body of this section 93 lies transversely in advance of the face 67 of the C-post, and its ends 94 are rearwardly extended and provided with an outwardly extended flange 95 connected to the face 67. The bottom edges 96 of the ends 94 contact with the upper flange 63 of the main body side sill and thus finish the interior of the tonneau in this location. At its upper edge, the lower section 93 of the front seat panel is provided with a rearwardly extending flange 97 on the underneath side of which is welded the base flange 98 of the intermediate front seat panel section 99. This section is convex rearwardly as appears in Figs. 2, 3 and 12, the convexity increasing upwardly. This intermediate section is of comparatively light gauge metal. Its top edge is provided with a forwardly extending flange 100 to which is welded the base flange 101 of the top section 102 of the rear seat panel. This top section is of relatively heavy gauge metal adapted strongly to reinforce and brace not only the intermediate panel section 99, but primarily to strongly cross brace the upper ends of this section of the C-post structures of the body. The upper edge of this section of the panel is turned forwardly and downwardly to form a downwardly presenting channel 103 adapted to receive the upper edge of the assembled upholstery within itself and to constitute by its exterior the finished front seat top rail of the body. Both the intermediate section 99 and the upper section 102 of this rear seat panel are anchored to the C-post structure by means of the vertically extending angles 70 (see Figs. 3 and 12) to which their opposite ends are welded. The edges of the panel sections 99, 102 thus make a butt joint with the edge of the inturned portion 67 of panel 60.

The cowl unit 51 comprises the usual cowl panel having top and side sections 104 and 105 respectively, usually made in one piece. The fore edge of this cowl panel is provided with an inward offset 106 and the fore edge of this offset is provided with an inwardly extending edge flange 107 to which usually a shroud pan is connected. According to my present invention in lieu of the shroud pan, I reinforce the fore end of the cowl structure by means of a perimetrally extending angle 108 nested within the angle between offset 106 and flange 107 (Fig. 15) and welded thereto. The inner edge of the angle 108 is beaded as shown at 109, to extend around offset 106 and to bear substantially against the adjacent walls of the main body of the cowl panel. Thus, not only is the front edge of the cowl retained in shape, as is common in case of the use of a shroud pan, but also in the absence of a shroud pan, the front end of this body is protected against distortion and indentation and other damage in handling the body during manufacture and shipment, projected both on its frontal edges and on the adjacent portions of the body panel itself.

The top 104 of this cowl panel is provided with an opening 110 for the installation of a ventilator 111 operated as usual by a mechanism 112 from within the cowl. This operating mechanism forms no part of my invention. This feature of my invention consists in providing inwardly extending flanges 113 on the edges of this opening and welding to these flanges by means of its outer side wall 114, the upwardly facing channel seat 115 which carries the seats 116 for the ventilator 111. By welding altogether the inwardly displaced flanges 113 and the side wall 114 of the channel, disfiguration of the exterior of the cowl which occurred in earlier constructions is entirely avoided.

Figures 13, 14, 15, 16, 17, 18, 23, 24, 27A:
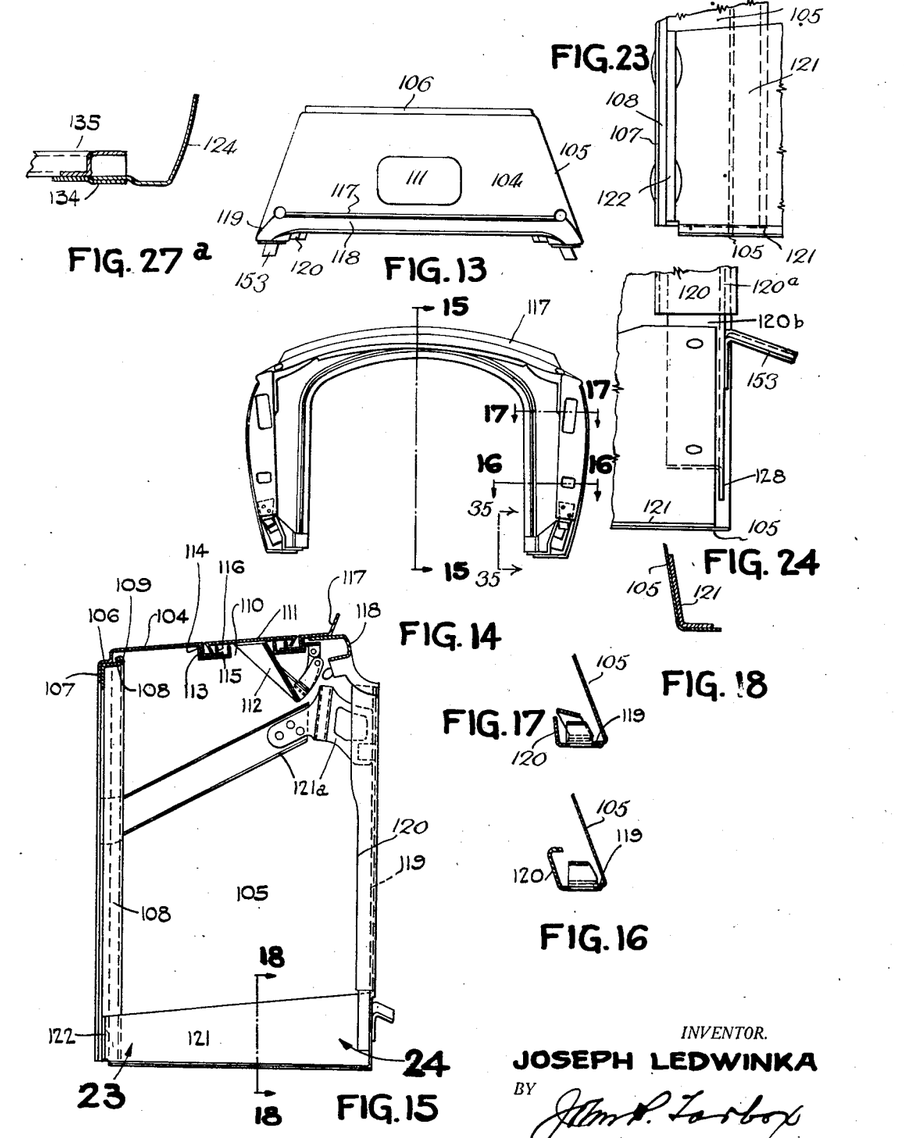
Figures 13 and 14 are, respectively, top plan and rear end elevation of the front or cowl unit.
Fig. 15 is a central vertical longitudinal section of this unit on an enlarged scale.
Figs. 16, 17 and 18 are, respectively, sections on the corresponding lines of Figs. 14 and 15, and in the directions indicated by the arrows.
Fig. 23 is an enlarged inside side elevation of the front lower end of the cowl structure taken at the point indicated by arrow 23 in Fig. 15.
Fig. 24 is a similar view of the rear lower end of the cowl structure taken at the point indicated by arrow 24 in Fig. 15.
Fig. 27a is a section taken on line 27a—27a of Fig. 26.

The rear edge of the upper portion 104 of the cowl panel is provided with an upwardly inclined flange 117 adapted to serve as an abutment for a windshield structure (Figs. 14 and 15). A finishing rail 118 of channel cross-section is secured by welding beneath the rear edge of the upper portion 104 of the cowl panel and projects rearwardly a slight distance therefrom. The rear portions of the side sections 105 are each provided with an inturned flange 119 (Figs. 16 and 17). This flange is cut away at its bottom as indicated in Figs. 15 and 24a. Co-extensive with this flange is a vertically extending post member 120 of combined channel and angle section facing outwardly and having its rear side wall welded to the exterior of the flange 119. Within the post structure formed by these members are secured the door mounting devices such as hinge sockets and the like.

Welded by its rearmost branch 120a to the rear wall of this post structure is a downwardly extending angle member 120b which faces forwardly and outwardly. This constitutes the base of the post structure just described.

At its bottom, the cowl unit is provided with a cowl side sill 121, as shown in Figs. 15, 19 to 22, and 36. This sill 121 is of angle section facing inwardly and upwardly and the bottom edge of the cowl panel 105 is turned inwardly and welded under the under flange of the sill as appears in Figs. 15 and 18. The fore end of the sill is offset inwardly as at 122a, Figs. 19 and 20 and secured by welding and riveting directly to the lower ends of the frame member 108 at the front end of the cowl. At its extremity, it is provided with an inwardly extending tab 122 similarly secured to the transverse branch of the angle member 108. Its rear end is also offset inwardly as at 121a, Figs. 19 and 20 and to a greater extent, being arched around the lower end of the base 120b of the A-post structure and welded to the inner wall thereof as clearly appears in Figs. 15 and 24a. Thus, the cowl unit is in its turn provided with a skeleton framework comprising the cowl side sills 121, the arched angle member 108, the post structures embodying elements 119, 120 and the transverse finishing rail 118, which latter is welded to the upper extremities of the posts at its opposite ends. Windshield supporting structures 121—a interconnect the vertical branches of member 108 and the upper ends of the A-post structures.

Figures 25, 26, 27, 28, 29, 30, 31, 32, 33, 34, 37, 40:
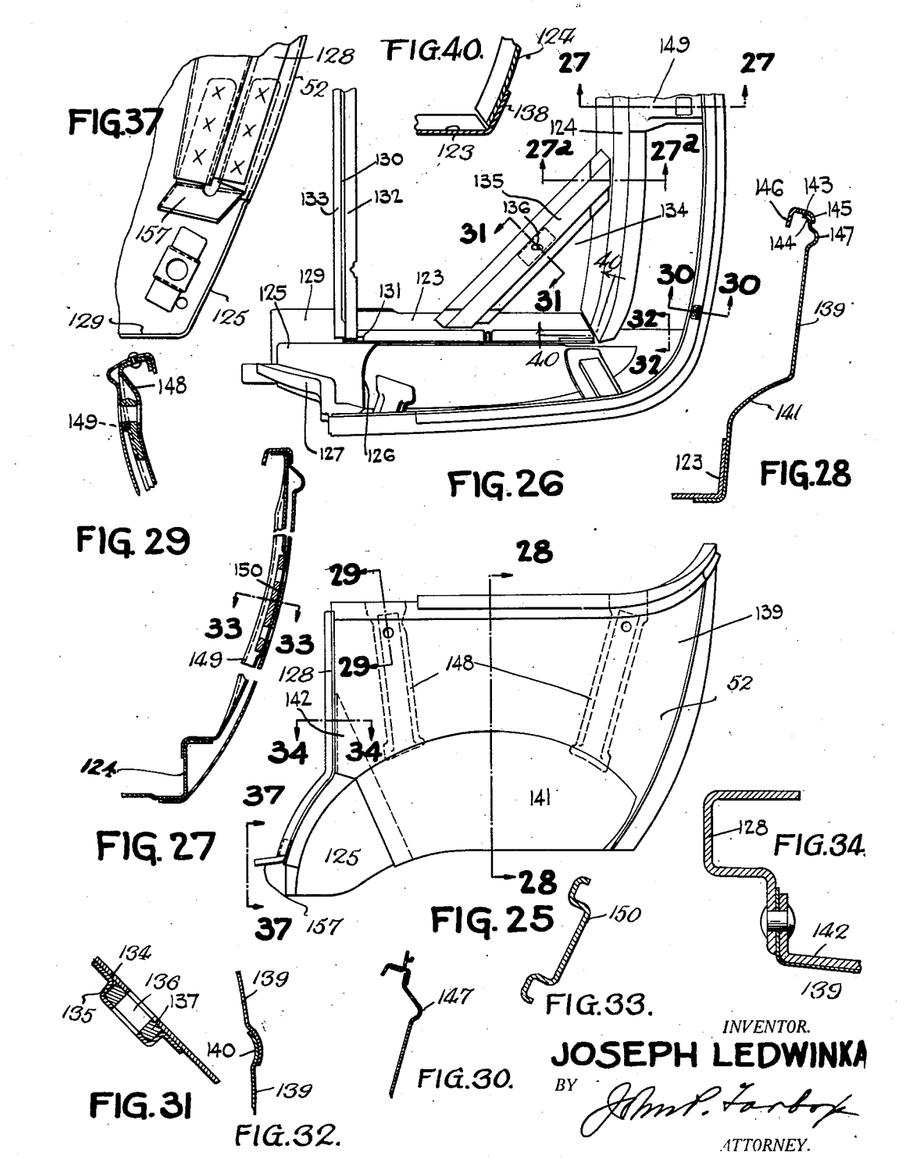
Figs. 25 and 26 are, respectively, outer side elevation and plan (the latter broken away adjacent the longitudinal center line) of the rear or tonneau unit of the structure.
Fig. 27 is a central, longitudinal, vertical section of the rear of this unit taken on the line 27—27 of Fig. 26.
Fig. 28 is a vertical, transverse section of the side of this structure taken on the line 28—28 of Fig. 25.
Figs. 29, 30, 31, 32, 33 and 34 are, respectively, sections taken on correspondingly designated lines in Figs. 25 and 26, and, in the case of Fig. 33, in Fig. 27.
Fig. 37 is a front end elevation of the associated lower front base end of the rear or tonneau unit taken as indicated by arrows 37—37 associated with Fig. 25.
Fig. 40 is a view taken as indicated by the arrows 40—40 associated with Fig. 26.

The tonneau unit 52 shown in detail in Figures 25 and 26, and the associated sections, comprises a skeleton frame made up of tonneau side sills 123 of angle section facing inwardly and upwardly (Fig. 28) and tonneau end sills 124 of Z section (Fig. 27). At their front ends the side sills 123 connect with a post D bracket 125. The post D bracket comprises a wheel housing portion 126 shaped to constitute a portion of the wheel housing in continuation of that portion formed by the tonneau panel, or otherwise, and a channel shape portion 127 following the arch of the wheel housing portion 126 constituting the base of the D post, the base of the D post 128 being built in extension of the upper end thereof. The bases of the wheel housing and channel portions, and especially the wheel housing portion, are provided with an inwardly-extending horizontal flange 129. Tonneau side sills 123 are nested in the angle between flange 129 and the wheel housing portion 126 and welded to the face of the wheel housing as well as to the horizontal flange 129 (Fig. 26). A transversely extending heelboard and seat support cross brace 130 is provided at its ends with inturned flanges 131 extending rearwardly and overlapping the extreme forward end of the tonneau side sills 123. At its top and bottom it is respectively provided with rearward and forwardly extending flanges 132, 133, the former of which is adapted to serve as the rear seat support and the latter of which is welded at its ends directly to the base flanges 129 of the post D brackets.

The horizontal branches of the sills 123, 124 are offset upwardly as shown in Fig. 27 and Fig. 27—A to receive beneath them the triangular gusset plates 134. The bodies of these gusset plates lying out of contact with the offset portions of the sills are inturned and offset forwardly to such an extent that the top surface of the gusset plates and the top surface of the horizontal portions of sills 124, 123 lie in a common plane. Extended across the outer margins of these triangular gusset plates are corner braces 135 of inverted channel section, the side walls of which are provided with outwardly extending lip flanges lying in a common plane. The braces, the gusset plate and the sills are welded triply together at the ends of the braces, and the flanges of the braces are welded to the plane upper surface of the corner gussets 134. There results a close jointed extremely rigid structure in these regions adapted when the body is secured to a chassis by bolts passing through the braces 135, to transmit the roadway stresses directly to the tonneau sills, and which by reason of the underlap and overlap relations of the gusset and brace, respectively, with the bottom and top of the sill structures, attains an embracing relation of parts supplementing the strength of the welded relation and resulting in a corner structure of maximum durability. An aperture 136 passes through brace 135, gussets 134, and a compression block 137 within the channel, as shown in Fig. 31 and Fig. 26, for the purpose of attaching to a chassis sill at this point. The tonneau side sills 123 and tonneau rear sills 124 have their vertical branches joined by an extension 138 from the tonneau side sills curved into overlapping engagement with the vertical branch of the tonneau rear sill and welded thereto.

The tonneau panel 139 is formed in two side sections and a rear section, welded together in the quarters in the beaded overlap construction shown in Fig. 32. This construction consists in outwardly beading the overlapping margin of each panel section, nesting them together and spot welding them in the body of the bead as indicated at 140. By welding through such a structure, the presence of depressions in the overlapped surfaces is avoided since the bead in general projects from the general level of the surface, and not only is it unlikely that any depressions will appear in such a raised surface as a result of welding, but when they do appear they can be most easily eradicated by a general brushing off of the surface or leveling down by means of an appropriate file. The depression can be easily reached in the narrow raised bead, whereas it can be reached only with difficulty and eliminated only by a regional lowering of an entire surface, when formed in the body of the panel.

The lower edges of the tonneau panel thus formed are inturned and welded to the underside of the tonneau sills as is usual. The fore edge is cut on a bias and conformed to the wheel housing portion 126, and the lower portion of the side sections are constituted wheel housings 141, Figs. 25 and 28. The front edges are provided with inturned flanges welded to the bodies 128 of the D posts, and both riveted and welded to these bodies, and the upper extensions 142 of the post D brackets shown especially in Fig. 25. The upper edges of the tonneau panel are provided with an inwardly and downwardly extending channel structure 143, the channel shaped section presenting inwardly and downwardly for the reception of the upper edge of the upholstery unit of the rear seat. This channel structure is preferably formed by inwardly rounding the upper edge of the panel proper, as indicated at 144, Fig. 28, complementally rounding the outer side wall 145 of a superimposed channel member 126 and spot welding the two together through the nested portions 144, 145. Through this results the same distinct advantage outlined in connection with the overlapped bead joint between the panel sections themselves as just described.

This top edge reinforcement extends around the entire top edge of the tonneau panel with the exception of the extreme ends. The superimposed member is made preferably of thicker metal than the body of the panel, giving greater strength and rigidity. Moreover, the body of the panel itself is outwardly beaded as at 147 to a greater extent, giving a still further strengthening of the top structure as well as the top edge finish thereto. At the ends of the panel, the bead 147 and the inturned portion 145 are made more prominent, the inturning being extended inwardly at least to the same extent as the channel member 146, as shown in Fig. 29, thus continuing the top rail finish to the fore edge of the D post 128, and the top rail is welded to the D post at these points.

Extended upwardly from the top of the wheel housings 141 at each side of the tonneau are top rail braces 148 having inturned upper ends nested within the channel of the top rail structure 145, 146, etc., welded at their lower ends to the wheel housing and riveted at their upper ends to the top rail. These braces 148 are of channel section and support, in their channels near their upper ends, the top iron sockets 149. Extending between the rear sill 124 and the top rail in the central plane of the car is a similar brace 149 similarly secured, and in this case carrying the spare tire anchorage 150 shown in Fig. 27. Thus the tonneau unit is provided with skeleton frame comprised of side and rear sills 123, 124, and the corner gusset construction, the braces 148 and 149, the post D brackets 125 and associated D post 128, the cross brace 130, and the top rail structure 145, 146, effectually tied not only directly to each other, but indirectly to each other through the outer paneling itself.

The units so constructed are secured together by the main side sill and post joints 53, 54. The joint 53 is the joint between the main side sills and the cowl unit. This joint, I form by cutting away the bottom wall of the channel section of the sill as appears in Figs. 4, 6 and 35 to form two forwardly extending ears 151 and 152 of the outer and inner side walls respectively. The outer ear carries an extension of the under flange of the outer portion of the sill. This outer ear is telescoped between the lower edge of the cowl side panel 105 and the body of the post base 120b as clearly appears in Fig. 39, being nested within the angle between the panel and its under lapping flange. The inner ear 152 is extended into overlapping engagement with the offset vertical branch of the side sill 121. The base 120b of the A-post and the body of sill 121 are both deflected inwardly to conform to the irregular conformation of the ear 152 occasioned by the threshold inclination of the main body side sill appearing in Figs. 36 and 39. An angle 153 (Figs. 24 and 35, etc.) is welded to the rear face of the post base 120b and to the under side of the bottom of the sill section channel. The ear 152 is riveted and welded both to the side sill and the post base 120—b. The outer ear 151 is seam-welded on the outside to the panel 105.

The rear joints 54 are fundamentally similar although they are made not directly with the tonneau sills but with fore extensions of them constituted by the post-D brackets. Here, as in case of the forward joints 53, the bottom of the channel section is removed to provide embracing ears 154, 155. The outer ear 154 overlaps the outer wall of the post section 127 of the post-D bracket 125 and has its end 156 turned inwardly to overlap the rear wall of this post portion which forms the forward portion of the crown of the wheel housing, see Figs. 25, 26 and 41. The inner ear 155 is considerably longer and overlaps not only the rear wall of the post portion 127, but also the inner wall of the wheel housing portion 126 to a considerable extent. Between the bottom wall of the post channel section and the bottom wall of the side sill channel is welded a reinforcing angle 157 shown in Figs. 38 and 37. The inner ear 155 is both welded and riveted to the wheel housing portion 126. The outer ear 154 is riveted and welded through its inturned portion to the outer and rear walls of post channel section.

These joints are at once simple, easily fabricated, easily assembled and completed. Yet, the embracing of the bases of the posts by the ears of the channel, the nesting of the angles of these ears within the angles of the post and wall bases and panels, together with the abutted relations of meeting edges makes each joint rigid, strong and durable. A construction in which the sill side walls embrace the adjoining frame elements in the manner described, gives all the benefits of a socketed construction without the provision of special extensions from the ends of the adjoining unit frames or from the bases of the posts to which the connection is directly made. Nor does it involve a substantial change of the construction of these post bases from that which enables them best to function as post bases.

The fact that I have described but one embodiment of my invention by no means limits my invention to that embodiment alone. The appended claims are intended to cover all embodiments of it.

What I claim is:

1. A pressed metal automobile body construction comprising a unitary side panel stamping having a vertical portion intermediate two door openings and threshold extensions of inwardly presenting channel section constituting a portion of a body side sill and forming the entire outer surface of the body below the door openings, said panel stamping being formed along the forward and rear edges of said vertical portion with inturned flanges constituting with the body of the panel body door posts.

2. A pressed metal body side sill of inverted channel section constituting a part of one body unit and having the bottom wall of the channel at one end thereof omitted, whereby the side walls of the channel extend beyond the bottom wall to constitute post embracing ears providing final assembly joint formations with the post forming a part of an adjacent body unit.

3. In a vehicle body, a cowl side panel having an inturned rear edge cut away at its bottom, an angle member secured to said inturned edge above the cut-away portion to form with the adjacent cowl panel a post body of channel section, and a post base secured within the section and projected downwardly in spaced relation to the lower edge of the cowl panel.

4. In a pressed metal vehicle body, in combination, a body side sill of inverted channel section forming a part of one unitary sub-assembly of the body, the side walls of said channel at one end thereof projecting beyond the bottom thereof, and a body post base forming a part of another unitary body sub-assembly and braced by said projecting portions of the side walls of said channel and projecting upwardly therebetween and secured thereto in final assembly.

5. In a vehicle body, in combination, an endmost body side panel, a section of body sill and a body post comprising a framework therefor, and an adjoining body side sill section of inverted channel section, the side walls of which embrace both the first named sill section and the post.

6. In a vehicle body, in combination, a body panel, a section of side sill and a body post connected therewith and constituting a framework therefor and an adjoining body side sill section of channel section the walls of which embrace both the post and the sill section aforesaid and the outer wall of which lies between the panel and the base of the post.

7. In a vehicle body construction, a body panel, an associated section of body sill, and an adjoining body side sill section of channel cross section, one wall of which is connected with the base of said panel and the other wall of which is connected with the associated sill section.

8. In a vehicle body construction comprising a side panel, an associated body post and a main body side sill of channel cross-section having one side wall of the channel connected with the panel and the other side wall connected with the post.

9. In a vehicle body, in combination, a cowl panel, a body post at the rear edge of the cowl panel and a cowl sill having its body deflected and secured to the inner wall of the post.

10. In a vehicle body, in combination, a side sill section having its inner face downwardly and inwardly inclined, an adjoining body side sill section, the body of which conforms to the contour of the vehicle body, and a door post at the juncture of said sill sections, the end of said adjoining sill section and the base of the body post being both deflected complementally to said inner face of the main body sill and secured thereto.

11. In a vehicle body, in combination, a body side sill of inverted channel section, a post the base of which is embraced by the channel side walls, and a brace from the bottom wall of the channel to the base of the post.

12. A post-D side sill joint comprising a post-D bracket having a wheel housing portion and a post-D base portion and a main body side sill of channel cross-section, the side walls of which are respectively connected to said two portions of said post-D bracket.

13. A post-D bracket joint comprising a post-D bracket having a wheel housing portion and a post-D base portion and a main body side sill having vertically extending side walls one of which overlaps and is secured to the inner face of the wheel housing section of the bracket and the other of which overlaps the outer face and is bent around to overlap the rear face of the post base portion and secured thereto.

14. In a vehicle body, a cowl panel having its front edge offset inwardly and flanged, and a reinforcing angle extending around said edge, said angle nesting with said offset portion and flange and having the inner edge of the branch thereof which extends longitudinally of the body formed with a strengthening conformation.

15. In a vehicle body, a cowl panel having an inwardly offset front edge provided with an inturned flange, and a reinforcing angle strip for said edge extending therearound and having its body nested in the angle between the flange and the offset and the inner edge thereof beaded outwardly to conform to the angle of the inward offset.

16. In a vehicle body, a cowl panel having its upper rear edge bent upwardly to constitute an upstanding rear abutment for a windshield construction, and a downwardly presenting garnish rail angular in section secured to the underside of the panel adjacent said upward extension and extending rearwardly beyond said extension.

17. In a vehicle body, in combination, a cowl panel having its rear, vertically extending edge inturned, a vertically extending reinforcing member secured to said inturned portion and forming with said portion and the adjacent section of the panel a post body structure, and a bottom extension from said post structure projecting at an angle inwardly and constituting a post base.

18. In combination, in a vehicle body, body posts, a seat back panel, a portion of the body of which lies forward of said posts and is provided with an end turned rearwardly and secured to a face of the post.

19. In a vehicle body, in combination, tonneau side and end sills, having horizontal web portions, the inner margins of which are offset upwardly, and a gusset plate the margins of which are offset downwardly to place its upper face in the plane of the upper faces of the horizontal webs, together with a diagonal brace overlying and secured to both the horizontal webs of the sills and said gusset plate in said plane.

20. In a vehicle body, a cowl panel having its upper rear edge bent upwardly to constitute a rear abutment for a windshield, and a garnish rail of substantially channel cross section presenting forwardly of the body having the upper wall thereof secured to the under side of the panel adjacent said abutment.

21. A fore extension adapted to be joined to a main body side sill comprising a stamping of substantially angle cross section presenting inwardly and upwardly of the automobile body, the forward portion of the vertically extending branch of said stamping being bent inwardly for securement to the front structure of the automobile body.

22. A fore extension adapted to be joined to a main body side sill comprising a stamping of substantially angle cross section presenting inwardly and upwardly of the automobile body, the rear portion of said stamping being inwardly offset and the upper section of the vertically extending branch of said angle stamping throughout said offset portion being upwardly and outwardly inclined.

23. In a vehicle body, a main body side sill of substantially inverted channel cross section, the inner wall of said channel sill at the rear end thereof projecting substantially beyond the base of the channel for securement to the inner surface of a body post structure, and the outer wall of said channel also projecting beyond said base but being inturned laterally to engage a transversely extending surface of said body post structure.

24. In a vehicle body, in combination, a main body side sill of channel cross section, the side walls of which project beyond the base thereof, and a body door post structure including a projecting member adapted to engage said body sill beneath the base thereof with the side walls of said sill embracing opposite surfaces of said body post structure.

25. In a pressed metal vehicle body, a post bracket having a wheel housing portion and a post portion together with a main body side sill of angular cross section having one of its walls connected with the bracket by an extension across the margin of the post portion having lapped engagement with the crown of the wheel housing portion of the bracket.

In testimony whereof I hereunto affix my signature.

JOSEPH LEDWINKA.